May 10, 1938.  T. A. KEEN  2,116,520
DOG STARTING APPARATUS
Filed July 21, 1934  2 Sheets-Sheet 1
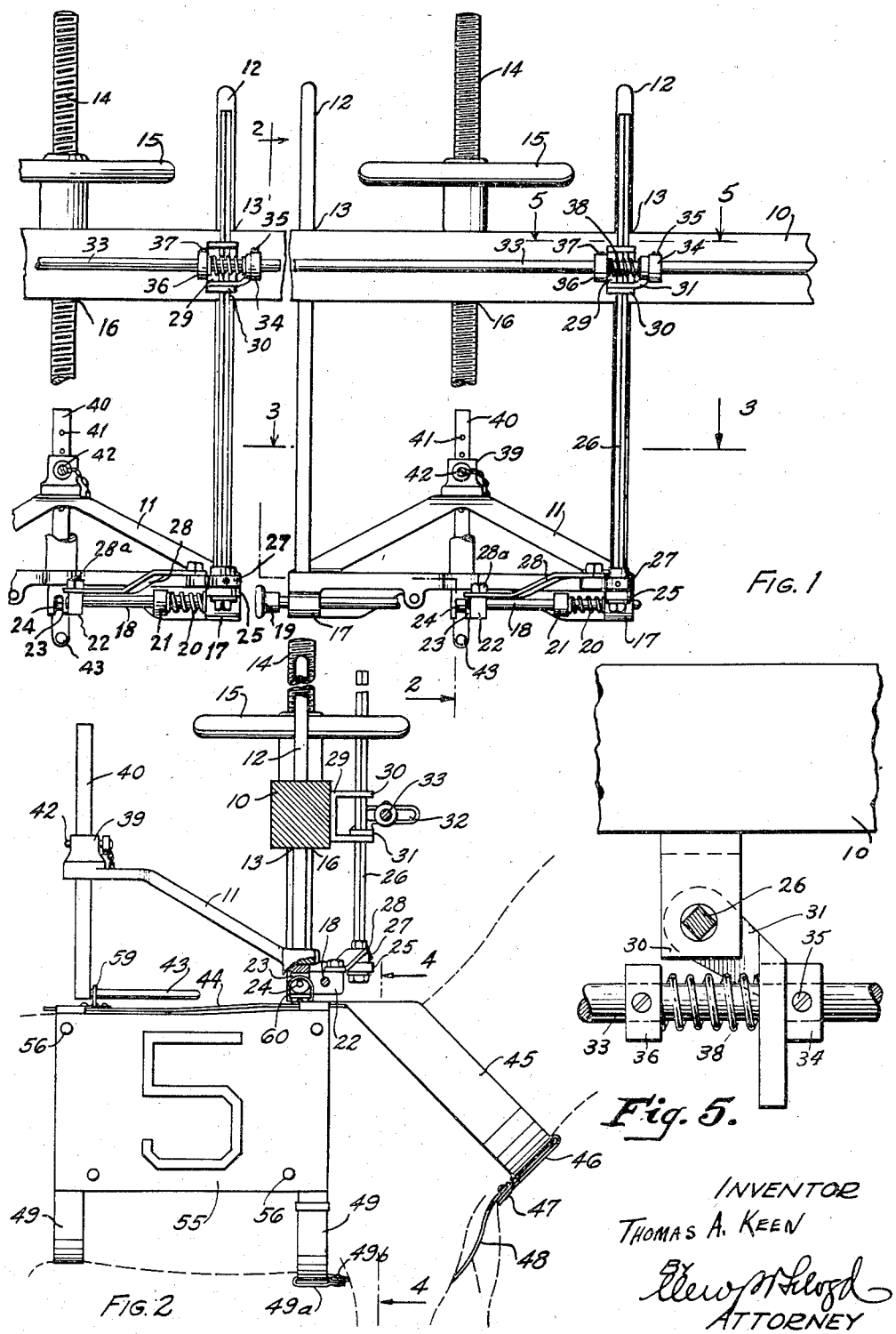
INVENTOR
THOMAS A. KEEN
ATTORNEY May 10, 1938.  T. A. KEEN  2,116,520
DOG STARTING APPARATUS
Filed July 21, 1934  2 Sheets-Sheet 2

INVENTOR
THOMAS A. KEEN
BY
ATTORNEY

Patented May 10, 1938

2,116,520

UNITED STATES PATENT OFFICE 2,116,520

DOG STARTING APPARATUS

Thomas A. Keen, San Mateo, Calif., assignor to Hannah M. Smith, River Forest, Ill.

Application July 21, 1934, Serial No. 736,307

17 Claims. (Cl. 119—15.5)

This invention relates to apparatus for holding a dog at a race starting position and has to do particularly with an improved type of harness and release means.

The present invention comprises, in part, improvements upon the device illustrated in the copending application serially numbered 531,389, entitled Dog starting apparatus, and filed April 20, 1931, in the name of Thomas A. Keen, upon which application United States Letters Patent Number 1,983,376, dated December 4, 1934 have been issued.

One object of the present invention is the provision in dog starting apparatus of novel dog holding means of complemental parts detachably associated with a dog harness.

Another object of the present invention is the provision in dog starting apparatus of complemental holding means arranged so that release of one of such means frees the dog to disconnect the other.

Another object of the present invention is the provision in dog harness of an improved manner of attaching an identification member.

Still another object of the present invention is the provision of an improved form of latch mechanism for releasably holding a dog racing harness.

With the above and other desirable objects in view, one form of the invention is hereinafter described in conjunction with the accompanying two sheets of drawings, hereby made a part of this specification, and in which:

Figure 1 is a fragmentary front elevation of dog starting apparatus embodying the subject matter of the present invention;

Figure 2 is a side elevation of the apparatus shown in Figure 1, and taken at the line 2—2 of said Figure 1, parts being broken away to illustrate the front holding means;

Figure 3:
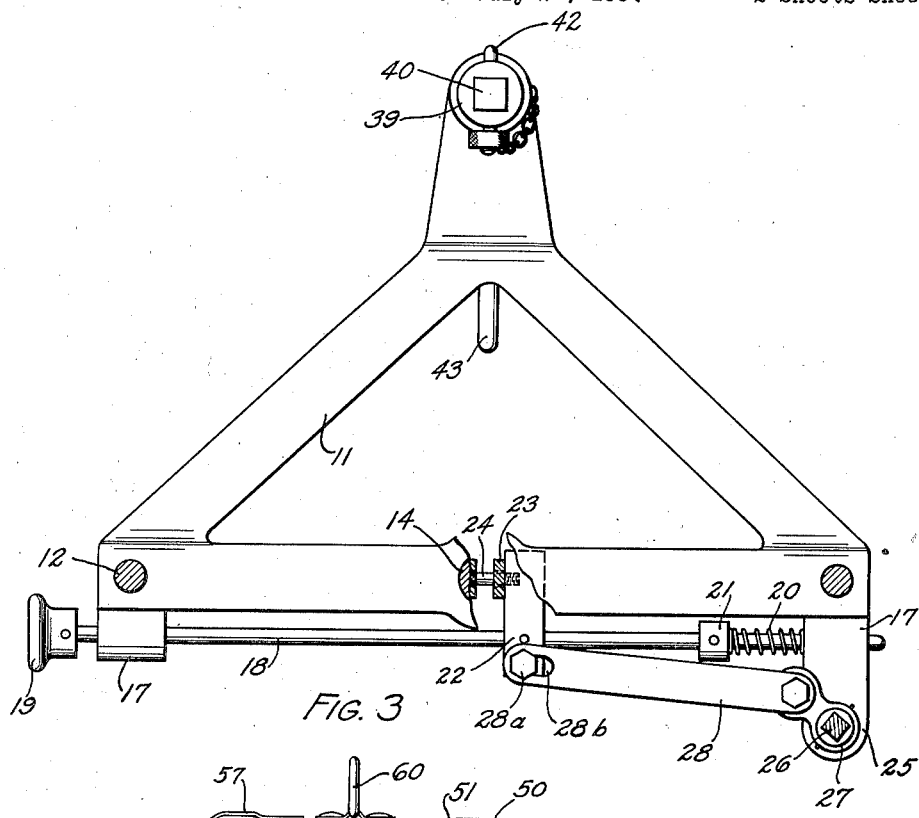
Figure 3 is a transverse section taken on the line 3—3 of Figure 1, looking in the direction of the arrows, parts being broken away to show the front locking means.
Figure 4:
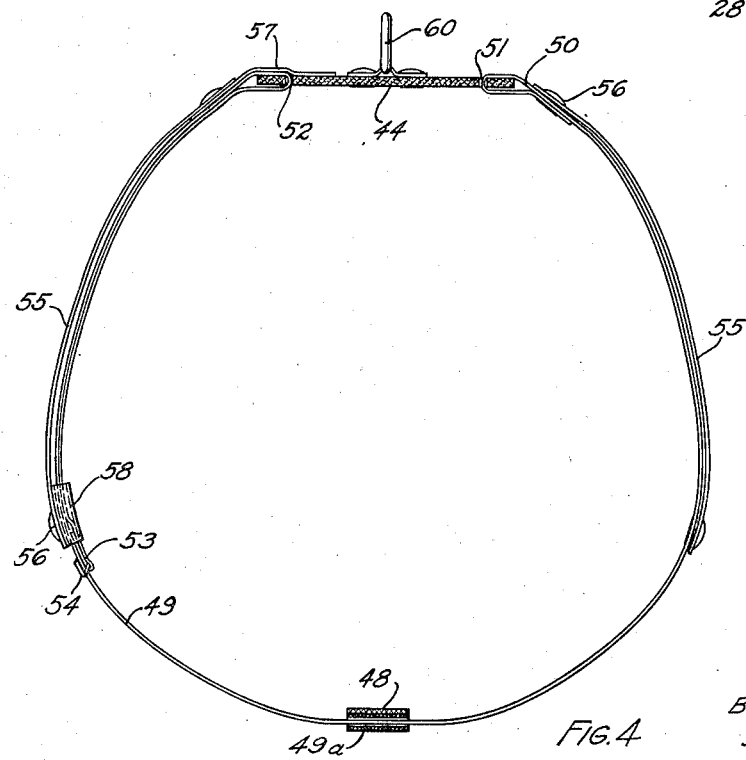

Figure 4 is a vertical section of the dog harness shown in Figure 2 and taken on the line 4—4 of that figure looking in the direction of the arrows; and Figure 5 is an enlarged detail view from above of a part of the device of Figures 1 and 2, as seen on line 5—5 of Figure 1.

Like reference characters are used in the drawings and throughout the following description to designate similar parts of the illustrated form of the invention.

A beam 10, shown in Figures 1 and 2, extends transversely of the race track. Beam 10 has thereon a series of dog holding members. The holding members are disposed at predetermined spaced intervals. One of such dog holding or starting members is illustrated and described.

A generally triangular frame 11 is disposed below the beam 10. Guide members 12 upon opposite corners of the front side of the frame member 11 extend upwardly through apertures 13 in the beam 10. A threaded rod 14 is attached to the center of the front side of the frame 11 and extends upwardly through an aperture 16 in the beam 10. Hand wheel 15 having a hub is threaded upon the rod 14. Rods 12 and 14 are freely movable within their respective guiding apertures in the beam 10 so that the device is supported by the hub of hand wheel 15 bearing upon the upper side of the beam 10. Rotation of hand wheel 15 in one direction lifts the frame 11 and its appendages, whereas rotation of the wheel in the opposite direction permits the frame to move downwardly under the force of gravity. This arrangement permits of vertical adjustment of the holding member to accommodate different sizes of dogs, the beam 10 always being supported at a fixed distance above ground.

Two bearings 17 are formed at the front of the frame 11. A rod 18 reciprocates therein. A knob 19 is disposed upon the outer end of the rod 18 for hand manipulation. A helical expansion spring 20 is disposed about one section of rod 18. A collar 21 is secured about rod 18 to engage one end of spring 20, and the other end bears against the vertical face of the adjacent bearing 17. Movement of the rod 18 to the left (Figure 1) under the urge of the spring 20 is limited by a latch bar 22 fixedly secured upon the rod 18, said bar 22 as it moves to the left engaging the right hand ear or member 23 of a pair of such members projecting downwardly from the frame 11 and forming a part of the latch mechanism. The ears 23 are apertured to receive a latch pin 24 which is anchored in the bar 22.

Frame 11, at its right side, Figure 1, has a bearing 25, which is a continuation or extension of the right hand bearing 17 and journalled therein is a vertically extending rod 26. Rod 26, within and beneath bearing 25, is circular in transverse section, and the remaining portion thereof is square.

An arm 27 is attached to the rod 26 above the bearing 25 and is movable in a horizontal plane with the rotation of the rod 26 on its vertical axis. A link 28 is pivotally connected to the free end of arm 27. A headed stud 28a is secured in trigger block 22 and the shank thereof is inserted through an elongated slot 28b in link 28. The slot 28b registers with stud 28 so that block 22 will move to the right of right hand ear 23 when rod 26 is rotated in a clockwise direction (viewed from above) and will allow manual manipulation of block 22 by rod 18 without moving link 28.

Beam 10 at its forward side has a bracket 29, having bearings 30 secured thereto. The bearings engage a section of the square portion of rod 26. An arm 31 is provided with an end having a square aperture to receive the rod 26. The bearings 30 and the aperture in the arm 31 permit of vertical axial movement of rod 26 therethrough. The bearings 30 are large enough to permit the square section of rod 26 to freely rotate therein. A movement of the arm 31 in a horizontal plane causes rotation of the rod 26 therewith.

The other end of the arm 31 has an elongated aperture 32 for receiving a section of an operating rod 33, (Figure 2). One side of the apertured end of the arm 31 bears normally against a collar 34, which is held in place upon the operating rod 33 by means of a set screw 35. A second collar 36, held fast to the rod 33 by a set screw 37, serves as a stop for a spring 38 about the rod 33. The spring 38 exerts expansive force between the collar 36 and the apertured end of the arm 31.

The back end of the frame 11 includes a bearing 39 having a vertical axis. The bearing 39 has a square opening extending vertically therethrough. A square rod 40 having therein a series of transverse apertures 41 may be inserted in bearing 39. The rod 40 is held in adjusted position in the bearing 39 by means of a pin 42 which traverses the rod through aligned apertures in the wall of bearing 39 and into any one of the apertures 41 for supporting the rod 40. Extending forwardly from the lower end of the rod 40 is a leg 43 to which the rear section of the dog harness is loosely secured.

The dog harness which is used with the holding member comprises a longitudinal back strap 44. The strap 44 is made of a piece of leather and is relatively stiff. The harness includes a neck band 45 connected to the front end of the back strap member 44. A loop 46 about the neck band 45 has one part of a snap fastener 47 thereon for connecting to an end of a breast strap 48 which has thereon the complemental part of snap fastener 47. Two body straps 49 encircle the dog. The straps 49 are identical except for length. They may be any suitable material. One strap 49 passes about the chest of the dog and is of greater length than the other, which passes about the dog's flanks.

A loop 49a at the lower end of the breast strap 48 extends about a section of the front strap 49. The loop 49a permits the strap 49 to slide therein. Opposite ends of the loop 49a are held together by a snap fastener member 49b. The right end of the strap 49, Figure 4, has a loop 50 extending through an aperture 51 in the back strap member 44. The strap 49 extends downwardly from the loop 50 about the body of the dog and upwardly to the left side of the back strap, Figure 4, and where it passes through an aperture 52. The left hand end of the strap 49, Figure 4, comprises a loop 53, to which is attached clasp member 54 through which strap 49 is slidable when the clasp is open.

Clasp member 54 may be of any conventional construction such as a clasp member used upon a man's suspenders and is adapted to engage and be disengaged from that section of strap 49 that is contiguous to the loop 53. When the clasp 54 is open, the effective length of the strap may be varied by sliding the clasp 54 along the main body of the strap 49. The strap 49 during this operation may be moved relatively to the aperture 52. The harness by adjustments of clasps 54 may be made to fit dogs of different sizes.

Identification aprons 55 are carried upon each side of the harness. Snap fasteners 56 may be employed for securing the aprons to the harness. One part of each fastener 56 is upon the aprons and the complemental part thereof is at the proper place upon the harness.

On the right side of the harness, Figure 4, one part of the fasteners 56 are secured to the straps 49. At the other side of the harness, one part of each of the two uppermost fasteners is secured to short straps 57, and one part of each of the two lower fasteners is attached to loops 58, which are slidable along the straps 49 to obtain proper spacing adjustment. The adjustment of the effective length of the straps 49 may thus be made without disturbing the relative position of either of the identification aprons. The aprons will always be supported at a fixed distance from the strap 44.

A connecting means which may be in the form of a metal ring 59 is arranged transversely of the back strap near its rear end. A connecting means or ring 60 is secured to said harness at its front end and in a plane longitudinal of the back strap 44. After securing the harness upon a dog, the ring 59 is held upright while the dog is backed into the position shown in Figure 2, the ring 59 being slipped backwardly along the holding means 43. A proper height for the rod 43 for releasably holding the ring 59 is had by adjusting the height of rod 40 in a manner hereinabove described.

The height of the frame 11 is adjusted by means of the hand wheel 15 until the ears 23 are lowered into registry with the ring 60 which is upright. The rod 18 is pushed to the right, Figure 1, by pressing the palm of the hand against the knob 19. In this manner, the block 22 and the pin 24 are moved to the right to move the pin out of the space between the ears 23. The ring 60 is then placed between the ears 23 and the rod 18 released whereupon the rod 18, block 22, and the pin 24 are shifted to the left by spring 20, the pin 24 through the ring 60 and the left hand ear 23. The dog is thus made secure.

Because of the freedom of the stud 28a to move to the right in slot 28b, no movement is imparted to the link 28 incident to the shifting of rod 18 for opening the latch to receive the ring 60.

Each of the series of dog holding or starting members upon the beam 10 is actuated simultaneously to release the dogs at the start of a race by moving the operating rod 33 to the left, Figure 1. Any suitable means may be employed for moving the rod 33. Such movement of the operating rod 33 causes the collar 34 to press against the end of arm 31 to pivot such arm and the rod 26 clockwise as viewed from above. The arm 27 moves with the rod 26 to shift the link 28 to the right, Figure 1, to move the block 22 and the latch pin 24 to the right for disengaging the ring 60.

While the rings 59 and 60 are held upon the members 43 and 24, respectively, the dog can move neither forwardly nor backwardly, and he cannot turn sidewise. As soon, however, as the ring 60 is released, the dog may move forwardly slipping the ring 59 from the member 43. Release of the connecting means 60 is had after the lure has passed to the front of the dog so that he will instinctively move forward to disengage the ring 59 from the holding bar 43.

What is claimed as new and is desired to be secured by Letters Patent of the United States is:

1. A dog starting apparatus comprising a harness having spaced apart ring members thereon, a frame, a stationary bar supported at one end on said frame and extending lengthwise of the harness for receiving one of said rings, and a latch means to secure the other of said rings.

2. Dog starting apparatus comprising a harness extending lengthwise of a dog and having a ring at the front and a second ring at the back thereof, a frame substantially coextensive with said harness, a rod supported at its rear end and extending forwardly upon said frame for engaging the back ring upon the harness, and latch means for the front ring at the front of said frame.

3. The combination with dog starting apparatus comprising a harness for a dog, and a frame having releasable latch means for engaging said harness, of a rod upon said frame and supported at its rear, and a ring upon said harness and slidable along said rod from its front.

4. Dog starting apparatus comprising a frame, ears depending from said frame, a latch pin movable through said ears, an operating rod for said pin and movable in parallelism with the movement of said pin, a second operating rod also movable in parallel with the movement of said pin, connecting means between said rods, and a harness having a ring insertable between said ears to be latched therein by said pin.

5. The combination described in claim 4, in which said connecting means is loose, so that said first mentioned rod may be operated independently of said second mentioned rod.

6. Dog starting apparatus comprising a harness having a ring anchored therein, and harness holding means comprising opposed ears extending longitudinally of such harness and having aligned apertures therein, a latch pin normally within said apertures and extending transversely of such harness between said ears and through said ring, said pin being movable from between said ears to release said ring, and means reciprocable transversely of said harness for moving said pin.

7. Dog starting apparatus comprising a holding means of apertured opposed members, latch means including a pin normally extending through the apertures in said members and being axially movable from between said members into an ineffective position, means urging said pin into its normal position, a dog harness having a ring-like member for insertion between said opposed members, said means including in part a manually operative release means in juxtaposition to said holding means for moving said pin against the force of said urging means to release said harness and movable in parallelism with the path of movement of said pin, and a second release means operable from a remote point for similarly moving said pin, there being a loose connection between said second release means and the latch means whereby the manually operative release means is operable independently of the second release means.

8. A harness comprising a back strap, with apertures therein, spaced apart body encircling straps on said back strap and adjustable as to length, each of said straps being fastened at one side of said back strap and being inserted at the other side through an aperture in said back strap, the end of each of said straps being parallel to the body encircling portion and having a clasp releasably securing said end to said body encircling portion, aprons at each side of the harness, each apron having fastening members at its corners, complemental fastening means on said body straps adjacent their anchored ends, stub straps arranged in parallelism with said body encircling straps adjacent to the apertures through which said straps are inserted and having the upper fastening means for one of said aprons thereon, and loops slidable along said straps having thereon the lower fastening means for said apron.

9. An identification apron, and fastening means therefor comprising the combination with a harness having a back strap and body encircling straps, of stub straps upon said back strap and arranged in parallelism, and holding means for the lower edge of said apron comprising members slidable on said body straps and to which the lower edge of said apron is secured, the apron depending from the stub straps on said harness.

10. Dog starting apparatus comprising a harness for the dog having holding members spaced apart longitudinally of the dog, a stationary support, a plurality of cooperative holding means spaced on said support longitudinally of the dog, one of said holding means being elongated in a direction extending longitudinally of the dog and having a free end over which loosely passes one of the cooperative holding means on the harness in such a manner as to permit release of said holding means by forward movement of the dog relative to the holding means the length of said elongated means, causing the holding means on the harness to move a considerable distance along the elongated holding means before its release, and the other of said cooperative holding means mounted on such support including a shiftable means adapted lockingly to engage the other holding means of the harness, and means for shifting the shiftable means of said cooperative holding means to release the same whereby to permit the dog to move forwardly to cause the release of the first mentioned holding means.

11. A dog starting apparatus comprising a harness having holding means spaced apart longitudinally of the dog, a stationary support, a plurality of coupling members carried by said support each engaging one of the spaced holding means of the harness to hold the dog from movement, means for releasing one of said holding means to permit the dog to move forwardly, the other of said holding means being slidably connected to another of said coupling members and permitting its automatic free release upon forward movement of the dog.

12. A dog starting device comprising a dog harness having a plurality of holding means thereon spaced apart longitudinally of the dog, a stationary support, a plurality of spaced apart cooperative holding means thereon, one thereof engaging one of the harness carried holding means for preventing backward or lateral releasing movements while permitting free longitudinal forward movement of the dog, the other holding means on said support adapted to engage the other harness carried holding means and having a shiftable member for locking the same, said second holding means adapted to prevent backward, forward or lateral releasing movements of the dog, and means for releasing the shiftable member of said second holding means permitting free forward movement of the dog to release the dog on forward movement from said first mentioned holding means.

13. In a starting apparatus for dogs the combination of the harness for a dog having spaced holding means extending longitudinally of the dog, a support having spaced cooperative holding means extending longitudinally of the dog, and each adapted to be operatively associated with one of the holding means on the harness, the rearmost holding means including mechanism permitting free release of the dog therefrom on forward movement of the dog but preventing lateral or rearward releasing movement of the dog, the forwardmost holding means including a shiftable member for lockingly holding the dog from forward, lateral or rearward movement, and means to release the shiftable member to permit forward movement of the dog to cause the automatic release of the dog from the rearward holding member.

14. In a dog starting apparatus in combination with a harness having rear and forward holding members spaced longitudinally of the dog, a support, a plurality of holding members thereon extending longitudinally of the dog, each adapted to cooperate with a holding member on the harness and forming a pair therewith, the rear pair of said holding members preventing movement of the dog in any but a forward direction, the forward pair of holding members preventing forward movement of the dog, and means for releasing the forward pair of holding members to permit forward movement of the dog and the consequent automatic release of the dog from the rear holding member.

15. In a dog starting apparatus the combination of a harness having a loop and a holding means spaced therefrom and extending longitudinally of the dog, a support, said support including a rod-like member elongated in the direction of the dog and having a free end adapted to engage freely in said loop to permit the loop on the harness to slide therealong and to disengage therefrom at the front end, a latching member mounted on said support and adapted to engage the holding means of the harness to hold the dog from forward movement, and means for actuating the latch to release the same to permit forward movement of the dog to automatically release the loop from the free end of the rod-like member.

16. In a dog starting apparatus, a harness for a dog, said harness having mounted thereon a forward holding element and a rear holding element, a vertically adjustable support, a latching mechanism mounted on said support and adapted to releasably engage one of said holding elements, and a securing means also mounted on the support and adapted to slidably and releasably engage the other of said holding elements, whereby upon release of the latching mechanism from its holding element, forward movement of the dog carrying the harness will automatically release the other holding element from its securing means.

17. In a dog starting apparatus in combination with a harness for each of a plurality of dogs, each harness having mounted thereon a forward holding element and a rear holding element, a vertically adjustable support for each harness, a latching mechanism mounted on each support and adapted to releasably engage one of said holding elements, a securing means also mounted on each support and adapted to slidably and releasably engage the other of said holding elements, whereby upon release of the latching mechanism from its holding element, forward movement of the dogs carrying the harness will automatically release the other holding element from its securing means, and a common means for releasing each of said latching mechanisms simultaneously.

THOMAS A. KEEN.